United States Patent
Ishikawa

(10) Patent No.: US 12,001,909 B2
(45) Date of Patent: Jun. 4, 2024

(54) COMMUNICATION APPARATUS

(71) Applicant: TOSHIBA TEC KABUSHIKI KAISHA, Tokyo (JP)

(72) Inventor: Hiroyuki Ishikawa, Sunto Shizuoka (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/879,275

(22) Filed: Aug. 2, 2022

(65) Prior Publication Data
US 2023/0177289 A1 Jun. 8, 2023

(30) Foreign Application Priority Data
Dec. 2, 2021 (JP) .................. 2021-196441

(51) Int. Cl.
*G06K 7/10* (2006.01)
*G06K 7/08* (2006.01)

(52) U.S. Cl.
CPC ......... *G06K 7/10366* (2013.01); *G06K 7/085* (2013.01); *G06K 7/10168* (2013.01)

(58) Field of Classification Search
CPC .............. G06K 7/10366; G06K 7/085; G06K 7/10168; G06K 19/07771
See application file for complete search history.

(56) References Cited

U.S. PATENT DOCUMENTS

| | | | | |
|---|---|---|---|---|
| 8,102,267 | B1 * | 1/2012 | Arumugam | G01S 5/12 340/572.1 |
| 10,212,553 | B1 * | 2/2019 | Ambha Madhusudhana | H04W 4/026 |
| 10,628,756 | B1 * | 4/2020 | Kuper | H04W 4/029 |
| 10,650,203 | B1 * | 5/2020 | Yamamoto | G06K 7/10366 |
| 2006/0170555 | A1 * | 8/2006 | Sweeney | G08B 13/2417 340/572.7 |
| 2007/0285236 | A1 * | 12/2007 | Batra | G01S 13/74 340/572.1 |
| 2009/0160638 | A1 * | 6/2009 | Jesme | G01S 13/825 340/539.11 |
| 2010/0182133 | A1 * | 7/2010 | Ando | G01S 13/62 340/10.51 |
| 2012/0087421 | A1 * | 4/2012 | Six | H03L 7/0814 455/67.11 |
| 2012/0127976 | A1 * | 5/2012 | Lin | G06K 17/0022 340/10.4 |
| 2013/0021193 | A1 * | 1/2013 | Hermsen | G01S 13/82 342/51 |
| 2014/0167920 | A1 * | 6/2014 | Kamiya | G01S 13/58 340/10.1 |
| 2015/0148129 | A1 * | 5/2015 | Austerlade | G06Q 50/20 463/31 |

(Continued)

*Primary Examiner* — Daniel I Walsh
(74) *Attorney, Agent, or Firm* — Kim & Stewart LLP

(57) ABSTRACT

According to an embodiment, a communication apparatus acquires tag data of each wireless tag at a plurality of positions of a moved antenna via an antenna. The communication apparatus inputs the tag data of each wireless tag into a learned model selected from a plurality of learned models in a manner that depends on an environment of the apparatus. In addition, the communication apparatus acquires, on the basis of input of the tag data of each wireless tag into the learned model, data indicating a range in which each wireless tag is present from the learned model.

2 Claims, 15 Drawing Sheets

(56) References Cited

U.S. PATENT DOCUMENTS

| | | | | |
|---|---|---|---|---|
| 2016/0371893 | A1* | 12/2016 | Busch-Sorensen | ........................... G06K 7/10128 |
| 2017/0157783 | A1* | 6/2017 | Ogawa | .................... F16P 3/003 |
| 2018/0260593 | A1* | 9/2018 | Enomoto | ............ G06K 7/10435 |
| 2018/0330293 | A1* | 11/2018 | Kulkarni | ............. G06K 7/10366 |
| 2019/0087615 | A1* | 3/2019 | Tomiyama | .......... G06K 7/10356 |
| 2019/0138975 | A1* | 5/2019 | Zuberi | ................ G06Q 10/087 |
| 2019/0392183 | A1* | 12/2019 | Oishi | ................ G06K 7/10376 |
| 2020/0381805 | A1* | 12/2020 | Shiohara | ............ H04N 1/00127 |
| 2021/0081620 | A1* | 3/2021 | Yaginuma | .......... G06K 7/10099 |
| 2021/0108983 | A1* | 4/2021 | Garbuzov | ............... G01L 11/00 |
| 2022/0058937 | A1* | 2/2022 | Demitri | ............. G06K 7/10366 |
| 2022/0108092 | A1* | 4/2022 | Wan | ................... G06K 7/10079 |
| 2022/0300780 | A1* | 9/2022 | Mahmood | .......... G06K 7/10376 |
| 2023/0025605 | A1* | 1/2023 | Stewart | ............. G06K 7/10366 |
| 2023/0062536 | A1* | 3/2023 | Ishikawa | ............ G06K 7/10009 |
| 2023/0077472 | A1* | 3/2023 | Takeno | .................... H01Q 3/04 343/757 |
| 2023/0176172 | A1* | 6/2023 | Ishikawa | ............... G01S 5/0249 342/450 |
| 2023/0177290 | A1* | 6/2023 | Ishikawa | ............ G06K 7/10366 235/451 |

\* cited by examiner

| | Position (mm) | 0 | a | 2a | ... | L-2a | L-a | L |
|---|---|---|---|---|---|---|---|---|
| Wireless tag A | Phase (°) | | | | | | | |
| | Received signal strength indicator | | | | | | | |
| Wireless tag B | Phase (°) | | | | | | | |
| | Received signal strength indicator | | | | | | | |
| ... | ... | | | | | | | |

Fig.3

COMMUNICATION APPARATUS

CROSS-REFERENCE TO RELATED APPLICATION

This application is based upon and claims the benefit of priority from the prior Japanese Patent Application No. 2021-196441, filed on Dec. 2, 2021, the entire contents of which are incorporated herein by reference.

FIELD

An embodiment described here generally relates to a communication apparatus.

BACKGROUND

There exists an apparatus that receives radio waves transmitted from a wireless tag attached to an article through an antenna to thereby determine whether the wireless tag is inside or outside a predetermined range. Such an apparatus moves the antenna and measures a phase of the wireless tag. The apparatus determines whether the wireless tag is inside or outside a predetermined range on the basis of a phase difference that is the amount of change in the measured phase. The apparatus needs to set the phase difference equivalent to the boundary of the predetermined range as a threshold.

In a case where a predetermined fixed threshold is used for a determination process, the determination accuracy lowers due to environmental influence such as external disturbance.

BRIEF DESCRIPTION OF THE DRAWINGS

FIG. 3 is a diagram showing an example of a data structure that constitutes measurement data according to the embodiment.

DETAILED DESCRIPTION

In accordance with one embodiment, a communication apparatus includes an antenna, a driving device, and a processor. The driving device moves the antenna. The processor acquires tag data of each wireless tag at a plurality of positions of the moved antenna via the antenna. The processor inputs the acquired tag data of each wireless tag into a learned model selected from a plurality of learned models in a manner that depends on an environment of the communication apparatus. The plurality of learned models is models depending on the environment of the communication apparatus and is models generated by machine learning based on a plurality of pieces of learning data. The plurality of pieces of learning data includes tag data of wireless tags that are a plurality of learning targets and data indicating a range in which each of the wireless tags that are the plurality of learning targets is present. In addition, the processor acquires, on the basis of input of the tag data of each wireless tag into the learned model, the data indicating the range in which each wireless tag is present from the learned model.

Hereinafter, a communication system according to an embodiment will be described with reference to the drawings. It should be noted that in the figures, the same reference signs denote the same or similar parts. As to each of the figures used for explaining embodiments below, the scales of the respective parts are changed as appropriate in some cases. Further, each of the figures used for explaining embodiments below is shown with configurations omitted for the sake of explanation in some cases.

Figure 1:
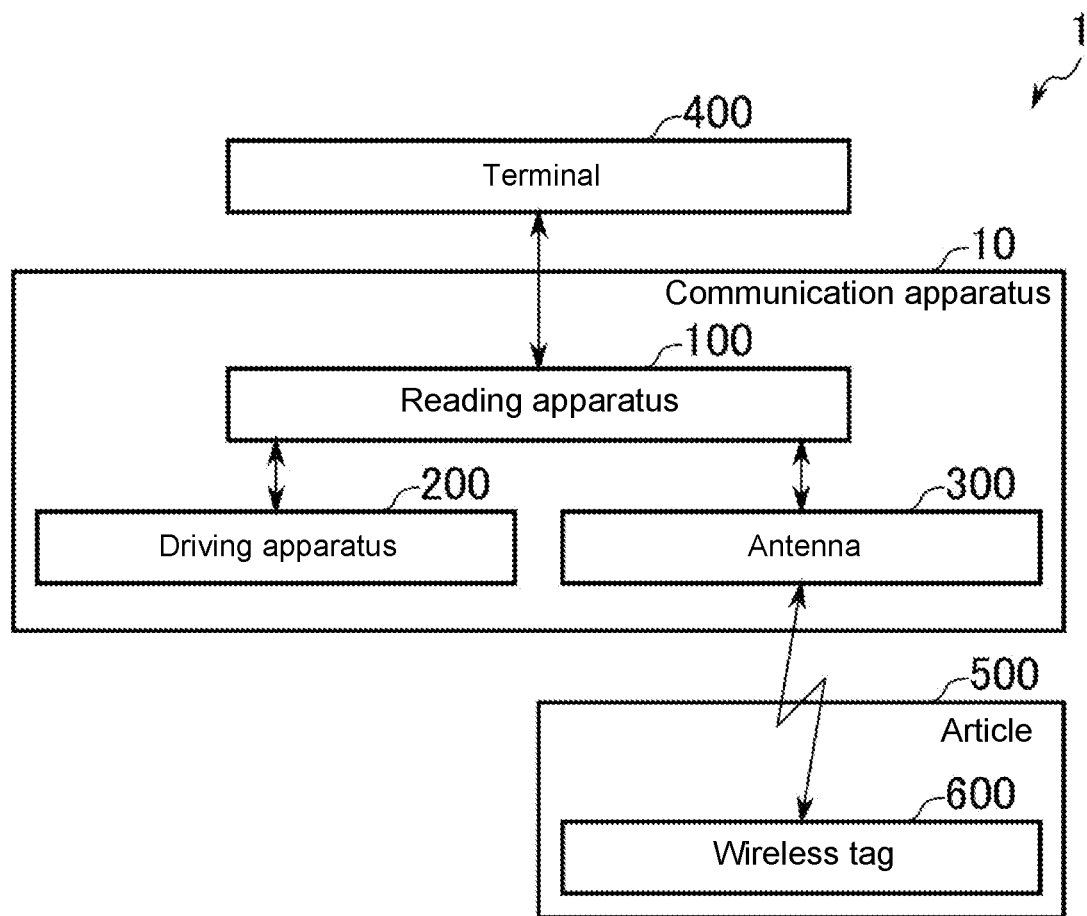
FIG. 1 is a block diagram showing an example of a communication system according to an embodiment.

FIG. 1 is a block diagram showing an example of a communication system 1 according to an embodiment. The communication system 1 includes a communication apparatus 10, a terminal 400, and a plurality of wireless tags 600 attached to a plurality of articles 500. Although FIG. 1 shows one wireless tag 600 attached to one article 500, the communication system 1 includes the plurality of wireless tags 600 attached to the plurality of articles 500. It should be noted that although the communication system 1 includes the communication apparatus 10 and the terminal 400, the communication system 1 does not need to include the plurality of articles 500.

The communication apparatus 10 is an apparatus that reads information from the wireless tag 600. The communication apparatus 10 can be used for checking goods in a warehouse, may be used for checking goods in a store, and the application example of the communication apparatus 10 is not limited thereto. The communication apparatus 10 includes a reading apparatus 100, a driving apparatus 200, and an antenna 300.

The reading apparatus 100 is an apparatus that controls the driving apparatus 200 and the antenna 300 reads information from the wireless tag 600. A configuration example of the reading apparatus 100 will be described later. The driving apparatus 200 is an apparatus that moves the antenna 300. A configuration example of the driving apparatus 200 will be described later. The antenna 300 sends and receives radio waves to/from the wireless tag 600. The antenna 300 converts radio waves received from the wireless tag 600 into a high-frequency signal and outputs the high-frequency signal to the reading apparatus 100.

The terminal 400 is an apparatus that processes information read from the wireless tag 600 by the reading apparatus 100. The terminal 400 is a personal computer (PC) or the like, only needs to be an apparatus that processes information, and is not limited thereto.

The article 500 is a commodity or the like. Typically, the wireless tag 600 is a radio frequency identification (RFID) tag. The wireless tag 600 may be another wireless tag. The wireless tag 600 is a passive wireless tag that operates using predetermined radio waves emitted from the antenna 300 as the energy source. The wireless tag 600 emits a signal including information stored in the wireless tag 600 by performing backscatter modulation with respect to a non-modulated signal. The information stored in the wireless tag 600 may include uniquely identifiable identification information. The information stored in the wireless tag 600 may include information related to the article 500 attached to the wireless tag 600.

Figure 2:
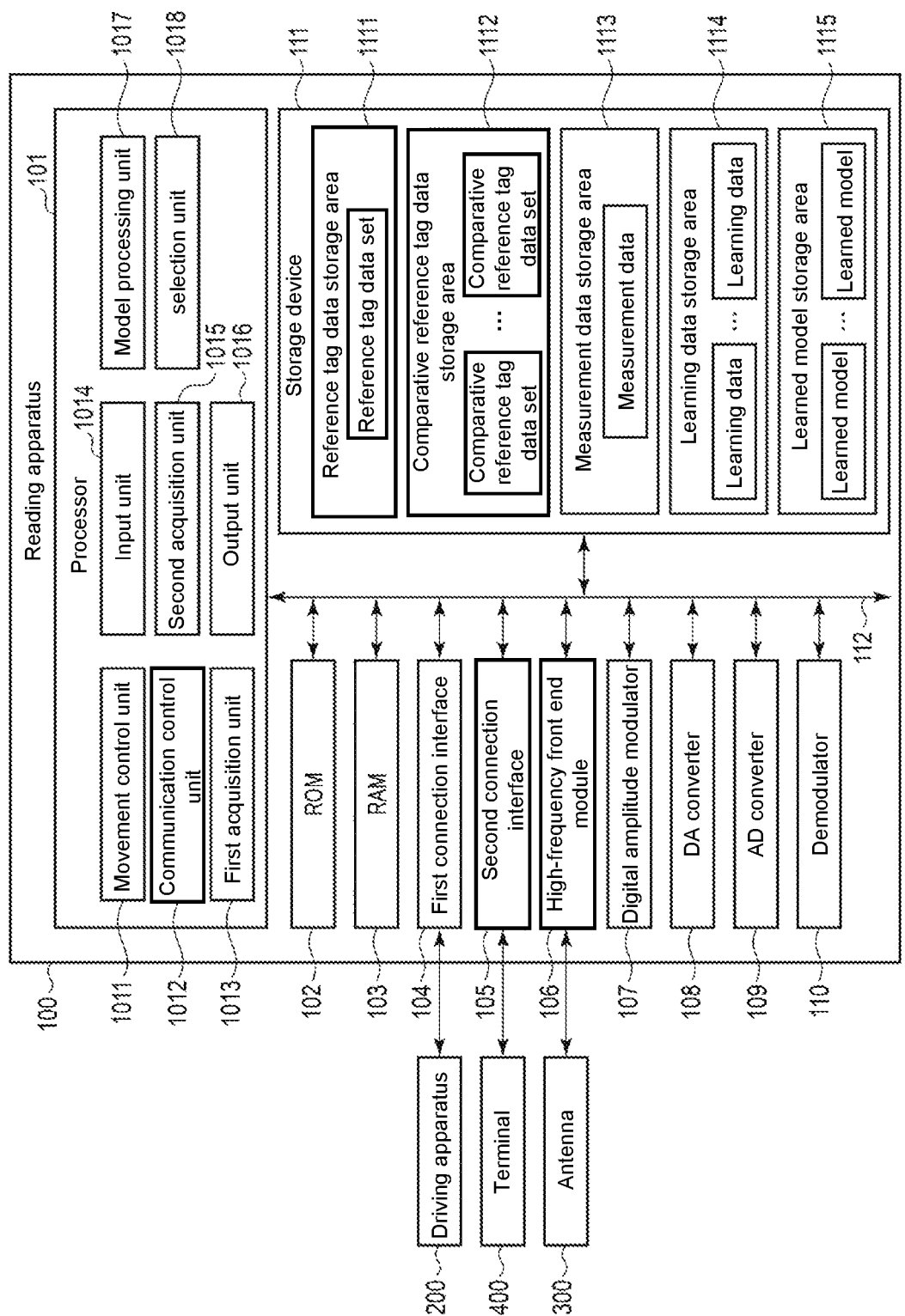
FIG. 2 is a block diagram showing an example of a reading apparatus according to the embodiment.

The reading apparatus 100 will be described with reference to FIG. 2. FIG. 2 is a block diagram showing an example of a configuration of the reading apparatus 100. The reading apparatus 100 includes a processor 101, a read-only memory (ROM) 102, a random-access memory (RAM) 103, a first connection interface 104, a second connection interface 105, a high-frequency front end module 106, a digital amplitude modulator 107, a digital to analog (DA) converter 108, an analog to digital (AD) converter 109, a demodulator 110, and a storage device 111. The respective parts included in the reading device 100 are connected via the bus 112 or the like.

The processor 101 corresponds to a central part of a computer that performs processes such as arithmetic operation and control required for the operation of the reading apparatus 100. The processor 101 puts various programs stored in the ROM 102, the storage device 111, or the like into the RAM 103. The processor 101 realizes respective parts to be described later and performs various operations by executing the programs loaded to the RAM 103.

The processor 101 is a central processing unit (CPU), a micro processing unit (MPU), a system on a chip (SoC), a digital signal processor (DSP), a graphics processing unit (GPU), an application specific integrated circuit (ASIC), a programmable logic device (PLD), a field-programmable gate array (FPGA), or the like. The processor 101 may be a combination of some of them.

The ROM 102 corresponds to a main storage apparatus of the computer using the processor 101 as the central part. The ROM 102 is a nonvolatile memory mainly used for reading data. The ROM 102 stores the programs. Further, the ROM 102 stores data, various setting values, and the like to use when the processor 101 performs various processes.

The RAM 103 corresponds to a main storage apparatus of the computer using the processor 101 as the central part. The RAM 103 is a memory used for reading and writing data. The RAM 103 is a work area for temporarily storing data to use when the processor 101 performs various processes.

The first connection interface 104 is an interface for the reading apparatus 100 to communicate with the driving apparatus 200.

The second connection interface 105 is an interface for the reading apparatus 100 to communicate with the terminal 400.

The high-frequency front end module 106 outputs a high-frequency signal to the antenna 300. The high-frequency front end module 106 inputs a high-frequency signal from the antenna 300.

The digital amplitude modulator 107 is a circuit that adds information sent to the wireless tag 600 to carrier waves sent to the wireless tag 600.

The DA converter 108 is a circuit that converts a digital signal into an analog signal. The DA converter 108 converts a digital signal modulated by the digital amplitude modulator 107 into an analog signal. The DA converter 108 outputs a high-frequency signal to the antenna 300 via the high-frequency front end module 106.

The AD converter 109 is a circuit that converts an analog signal into a digital signal. The AD converter 109 converts a high-frequency signal input from the antenna 300 into a digital signal via the high-frequency front end module 106.

The demodulator 110 is a circuit that extracts various kinds of information from radio waves received from the wireless tag 600. For example, the demodulator 110 extracts a unique identification code stored in the wireless tag 600 from the digital signal converted by the AD converter 109. Further, the demodulator 110 time-sequentially outputs the tag data of the wireless tag 600 from the digital signal converted by the AD converter 109 when radio waves of the wireless tag 600 are received from the antenna 300 by a well-known technology. The tag data is time-sequential data based on radio waves of the wireless tag 600 received by the antenna 300. The tag data includes phase data. The phase data is data indicating a phase of radio waves from the wireless tag 600. The tag data includes received signal strength indicator (RSSI) data. The received signal strength indicator data is data indicating received strength of radio waves from the wireless tag 600. The tag data includes at least one of the phase data or the received signal strength indicator data. It should be noted that when each wireless tag 600 receives radio waves emitted from the antenna 300, each wireless tag 600 can store the received signal strength indicator data in a memory of each wireless tag 600. In this example, the demodulator 110 may time-sequentially extract the received signal strength indicator data stored in the wireless tag 600 from the digital signal converted by the AD converter 109. The demodulator 110 is an example of a detector that time-sequentially detects tag data of each wireless tag 600 on the basis of radio waves from each wireless tag 600.

The storage device 111 is an apparatus constituted by a nonvolatile memory that stores data, a program, or the like. Although the storage device 111 is constituted by a hard disk drive (HDD), a solid state drive (SSD), or the like, the storage device 111 is not limited thereto. The storage device 111 is an example of the storage unit.

The storage device 111 includes a reference tag data storage area 1111. the reference tag data storage area 1111 stores a reference tag data set of the reference wireless tag. The reference tag data set is a set of a plurality of pieces of tag data of the reference wireless tag measured by the communication apparatus 10. Hereinafter, tag data of the reference wireless tag that is related to the reference tag data set will be also referred to as reference tag data. The reference tag data set includes a plurality of pieces of reference tag data of reference wireless tags at the plurality of positions of the antenna 300. Each of the plurality of positions of the antenna 300 is a measurement position of the tag data. The communication apparatus 10 can be capable of measuring the reference tag data at all the plurality of positions of the antenna 300. In this example, the reference tag data set includes reference tag data associated with each of all the plurality of positions of the antenna 300. The communication apparatus 10 can be capable of measuring the reference tag data only at some of the plurality of positions of the antenna 300. In this example, the reference tag data set includes reference tag data associated with each of some of the plurality of positions of the antenna 300. The reference tag data set is an example of the reference tag data of the reference wireless tags at the plurality of positions of the antenna 300.

The reference wireless tag is a wireless tag arranged at a predetermined position. The reference wireless tag may be arranged at a predetermined position of a counter table 700 (see FIG. 4) to be described later. The reference wireless tag only needs to be capable of being arranged at a predetermined position and may be attachable and detachable to/from the counter table 700. The reference wireless tag may include a single wireless tag or may include a plurality of wireless tags. In a case where the reference wireless tag includes a plurality of wireless tags, the plurality of wireless tags can be arranged at different positions of the counter table 700. The reference wireless tag is an example of the wireless tag. The reference tag data set can be updated on the basis of measurement of the communication apparatus 10.

The storage device 111 has a comparative reference tag data storage area 1112. The comparative reference tag data storage area 1112 stores a plurality of comparative reference tag data sets.

The comparative reference tag data set is a set of a plurality of pieces of tag data of the reference wireless tag that is measured by the communication apparatus in advance. Hereinafter, the tag data of the reference wireless tag related to the comparative reference tag data set will be also referred to as a comparative reference tag data. Here, although the description will be given assuming that the communication apparatus that measures the comparative reference tag data in advance is the communication apparatus 10 for the sake of simplification of the description, the communication apparatus may be one or more communication apparatuses of the same type as the communication apparatus 10. The comparative reference tag data set includes the plurality of pieces of comparative reference tag data of the reference wireless tags at the plurality of positions of the antenna 300. The communication apparatus 10 can be capable of measuring the comparative reference tag data at all the plurality of positions of the antenna 300. In this example, the comparative reference tag data set includes comparative reference tag data associated with each of all the plurality of positions of the antenna 300. The communication apparatus 10 can be capable of measuring the comparative reference tag data only at some of the plurality of positions of the antenna 300. In this example, the comparative reference tag data set includes comparative reference tag data associated with each of some of the plurality of positions of the antenna 300. The reference wireless tag used in measurement of the comparative reference tag data is a tag arranged at a predetermined position like the reference wireless tag used in measurement of the reference tag data. The plurality of comparative reference tag data sets is an example of the plurality of pieces of comparative tag data to be compared to the reference tag data set.

The plurality of comparative reference tag data sets is a data set depending on an environment of the communication apparatus 10. That is, the plurality of comparative reference tag data sets is different data sets depending on the environment of the communication apparatus 10. The environment of the communication apparatus 10 is an environment that affects the tag data. The environment of the communication apparatus 10 includes an arrangement aspect of a metal item with respect to the communication apparatus 10. For example, the arrangement aspect of the metal item with respect to the communication apparatus 10 is an arrangement aspect of a metal item around the communication apparatus 10. Although the metal item is an element containing metal, such as a metal plate and a metal shelf, the metal item is not limited thereto.

The arrangement aspect of a metal item is an arrangement aspect of a metal item that affects the tag data. The arrangement aspect of a metal item includes the presence/absence of the metal item with respect to the communication apparatus 10. The arrangement aspect of a metal item may include the distance between the communication apparatus 10 and the metal item. The arrangement aspect of a metal item may include the position of the metal item with respect to the communication apparatus 10. The plurality of comparative reference tag data sets may include comparative reference tag data set depending on an environment in which the metal item is not arranged with respect to the communication apparatus 10. The plurality of comparative reference tag data sets may include comparative reference tag data set depending on an environment in which the metal item is arranged with respect to the communication apparatus 10. The plurality of comparative reference tag data sets may include a plurality of pieces of comparative reference tag data depending on the environment in which the metal item is arranged with respect to the communication apparatus 10 and the distance between the communication apparatus 10 and the metal item. The plurality of comparative reference tag data sets may include a plurality of comparative reference tag data sets depending on the environment in which the metal item is arranged with respect to the communication apparatus 10 and the position of the metal item with respect to the communication apparatus 10. It should be noted that the arrangement aspect of the metal item is not limited to the presence/absence, the distance, and the position of the metal item. The arrangement aspect of a metal item may include shape and size of the metal item, the number of metal items, and the like.

The plurality of comparative reference tag data sets is associated with a plurality of learned models to be described later. That is, each of the plurality of comparative reference tag data sets is associated with each of the plurality of learned models for each environment of the communication apparatus 10. The plurality of comparative reference tag data sets can be updated as appropriate.

The storage device 111 has a measurement data storage area 1113. The measurement data storage area 1113 stores measurement data. The measurement data includes a plurality of determinative tag data sets. The determinative tag data set is a data set for each wireless tag 600 that is a determination target. The determinative tag data set is a set of a plurality of pieces of tag data of the wireless tag 600 that is the determination target, which has been measured by the communication apparatus 10. Hereinafter, the tag data of the wireless tag 600 that is the determination target related to the determinative tag data set will be also referred to as determinative tag data. The determinative tag data set includes a plurality of pieces of determinative tag data of the wireless tags 600 that are the determination targets at the plurality of positions of the antenna 300. Depending on the wireless tag 600 that is the determination target, the communication apparatus 10 can be capable of measuring the determinative tag data at all the plurality of positions of the antenna 300. In this example, the determinative tag data set includes determinative tag data associated with each of all the plurality of positions of the antenna 300. Depending on the wireless tag 600 that is the determination target, the communication apparatus 10 can be capable of measuring the determinative tag data only at some of the plurality of positions of the antenna 300. In this example, the determinative tag data set includes determinative tag data associated with each of some of the plurality of positions of the antenna 300. The plurality of determinative tag data sets is an example of the determinative tag data of respective wireless tags 600 that are the determination targets at the plurality of positions of the antenna 300.

The wireless tag 600 that is the determination target is a wireless tag that is a target with respect to which the range in which the wireless tag 600 is present is determined. The wireless tag 600 that is the determination target is an example of the wireless tag that is a measurement target. the wireless tag that is the measurement target will be also referred to as a measurement target wireless tag. The wireless tag 600 that is the determination target is an example of the wireless tag. The plurality of wireless tags 600 that is determination targets is a set of wireless tags the tag data of which is measured by a common measurement process of the communication apparatus 10. The measurement process is a process of measuring the tag data. The measurement process is a process associated with the movement of the antenna 300. For example, a single measurement process is a process associated with the movement of the antenna 300 within the scanning range of the antenna 300. The target with respect to which the range in which the wireless tag 600 is present is determined includes a target with respect to which whether the position of the wireless tag 600 is included in a first range or a second range is determined. The first range and the second range are different ranges not overlapping each other. For example, the first range and the second range are three-dimensional regions. As example of the first range and the second range will be described later. The measurement data can be updated on the basis of measurement of the communication apparatus 10. A configuration example of the measurement data will be described later.

The storage device 111 has a learning data storage area 1114. The learning data storage area 1114 stores a plurality of pieces of learning data. The learning data is data including data measured by the communication apparatus in advance. Here, although the description will be given assuming that the communication apparatus that measures the data included in the learning data in advance is the communication apparatus 10 for the sake of simplification of the description, the communication apparatus may be one or more communication apparatuses of the same type as the communication apparatus 10. The learning data is data used for machine learning. The plurality of pieces of learning data is data depending on the environment of the communication apparatus 10. That is, the plurality of pieces of learning data is different pieces of data depending on the environment of the communication apparatus 10.

The plurality of pieces of learning data includes a learning tag data set. The learning tag data set includes a plurality of data sets regarding wireless tags 600 that are a plurality of learning targets. The wireless tags 600 that are the plurality of learning targets is a set of wireless tags the tag data of which is measured by a common measurement process of the communication apparatus 10. The data set regarding the wireless tags 600 that are the learning targets includes a plurality of pieces of tag data of the wireless tags 600 that are the learning targets at the plurality of positions of the antenna 300. Hereinafter, the tag data of the wireless tags 600 that are the learning targets related to the learning tag data set will be also referred to as learning tag data. Depending the wireless tags 600 that are the learning targets, the communication apparatus 10 can be capable of measuring the learning tag data at all the plurality of positions of the antenna 300. In this example, the data set regarding the wireless tags 600 that are the learning targets includes learning tag data associated with each of all the plurality of positions of the antenna 300. Depending the wireless tags 600 that are the learning targets, the communication apparatus 10 can be capable of measuring the learning tag data only at some of the plurality of positions of the antenna 300. In this example, the data set regarding the wireless tags 600 that are the learning targets includes learning tag data associated with each of some of the plurality of positions of the antenna 300. The data set regarding the wireless tags 600 that are the learning targets is an example of the learning tag data of the wireless tags 600 that are the learning targets. The learning tag data set is an example of the learning tag data of the wireless tags 600 that are the plurality of learning targets. The wireless tags 600 that are the learning targets is an example of the wireless tag.

The plurality of pieces of learning data includes data indicating a range in which each of the wireless tags 600 that are the plurality of learning targets is present. Hereinafter, the data indicating the range in which each of the wireless tags 600 that are the plurality of learning targets is present will be also referred to as correct data. The correct data includes data indicating whether each of the wireless tags 600 that are the plurality of learning targets is included in the first range or the second range. The wording, "each of the wireless tags 600 that are the plurality of learning targets" may be replaced by "the position of each of the wireless tags 600 that are the plurality of learning targets". The correct data is data input by a user. The plurality of pieces of learning data can be updated.

The storage device 111 has a learned model storage area 1115. The learned model storage area 1115 stores a plurality of learned models. The plurality of learned models is models depending on the environment of the communication apparatus 10 and is models generated by machine learning based on the plurality of pieces of learning data. That is, each of the plurality of learned models is a model depending on the environment of the communication apparatus 10 that is generated by machine learning based on each of the plurality of pieces of learning data. The term, "generation" includes not only an aspect of new creation but also an aspect of update. The plurality of learned models is used for determining the range in which the wireless tag 600 that is the determination target is present.

On the basis of the input of determinative input data, the learned model outputs determinative output data. The determinative input data is the plurality of determinative tag data sets described above. The determinative output data is data indicating a range in which each wireless tag 600 that is the determination target is present. The data indicating the range in which each wireless tag 600 that is the determination target is present includes data indicating whether each wireless tag 600 that is the determination target is included in the first range or the second range. The data indicating where each wireless tag 600 that is the determination target is included includes data indicating where the position of each wireless tag 600 that is the determination target is included. Each wireless tag 600 that is the determination target is associated with the first range or the second range.

The bus 112 includes a control bus, an address bus, a data bus, and the like. The bus 112 transmits a signal exchanged between the respective parts of the reading apparatus 100.

It should be noted that a hardware configuration of the reading apparatus 100 is not limited to the above-mentioned configuration. As to the reading apparatus 100, the above-mentioned components can be omitted or modified or new components can be added as appropriate.

The respective parts realized by the processor 101 will be described. The processor 101 realizes a movement control unit 1011, a communication control unit 1012, a first acquisition unit 1013, an input unit 1014, a second acquisition unit 1015, an output unit 1016, a model processing unit 1017, and a selection unit 1018. It can also be said that the respective parts realized by the processor 101 are respective functions. It can also be said that the respective parts realized by the processor 101 are realized by a control unit including the processor 101, the ROM 102, and the RAM 103.

The movement control unit 1011 controls the movement of the antenna 300 by controlling the driving apparatus 200.

The communication control unit 1012 controls radio wave transmission from the antenna 300.

The first acquisition unit 1013 acquires the reference tag data set depending on the environment of the communication apparatus 10. The first acquisition unit 1013 acquires the plurality of determinative tag data sets.

The input unit 1014 inputs determinative input data into a learned model selected from the plurality of learned models in a manner that depends on the environment of the communication apparatus 10. The determinative input data is a plurality of determinative tag data sets acquired by the first acquisition unit 1013.

On the basis of the input of the determinative input data into the learned model by the input unit 1014, the second acquisition unit 1015 acquires determinative output data from the learned model.

The output unit 1016 outputs a determination result to the terminal 400. The determination result includes data indicating the range in which each wireless tag 600 that is the determination target is present, which has been acquired by the second acquisition unit 1015 as the determinative output data.

The model processing unit 1017 generates a learned model.

The selection unit 1018 selects one learned model from the plurality of learned models stored in the learned model storage area 1115. For example, the selection unit 1018 selects a learned model from the plurality of learned models in a manner that depends on the environment of the communication apparatus 10.

FIG. 3 is a diagram showing an example of a data structure that constitutes measurement data. It is assumed that the antenna 300 moves reciprocally in one direction under the control of the driving apparatus 200. It is assumed that the scanning range of the antenna 300 is a range in one direction a position L from a position 0 corresponding to a home position. The position L can be set as appropriate.

The measurement data includes determinative tag data set of each wireless tag 600 that is the determination target. The determinative tag data set includes a plurality of pieces of determinative tag data of the wireless tags 600 that are the determination targets at the plurality of positions of the antenna 300. For example, the plurality of positions of the antenna 300 includes positions in constant intervals a between the position 0 to the position L. A value of the constant interval a can be set as appropriate. Depending on the wireless tag 600 that is the determination target, the communication apparatus 10 can be capable of measuring the determinative tag data at all the positions in the constant intervals a between the position 0 to the position L. Depending on the wireless tag 600 that is the determination target, the communication apparatus 10 can be capable of measuring the determinative tag data at some of the positions in the constant intervals a between the position 0 to the position L. The plurality of positions of the antenna 300 may include one or more positions different from the positions in the constant intervals a between the position 0 to the position L.

Figure 4:
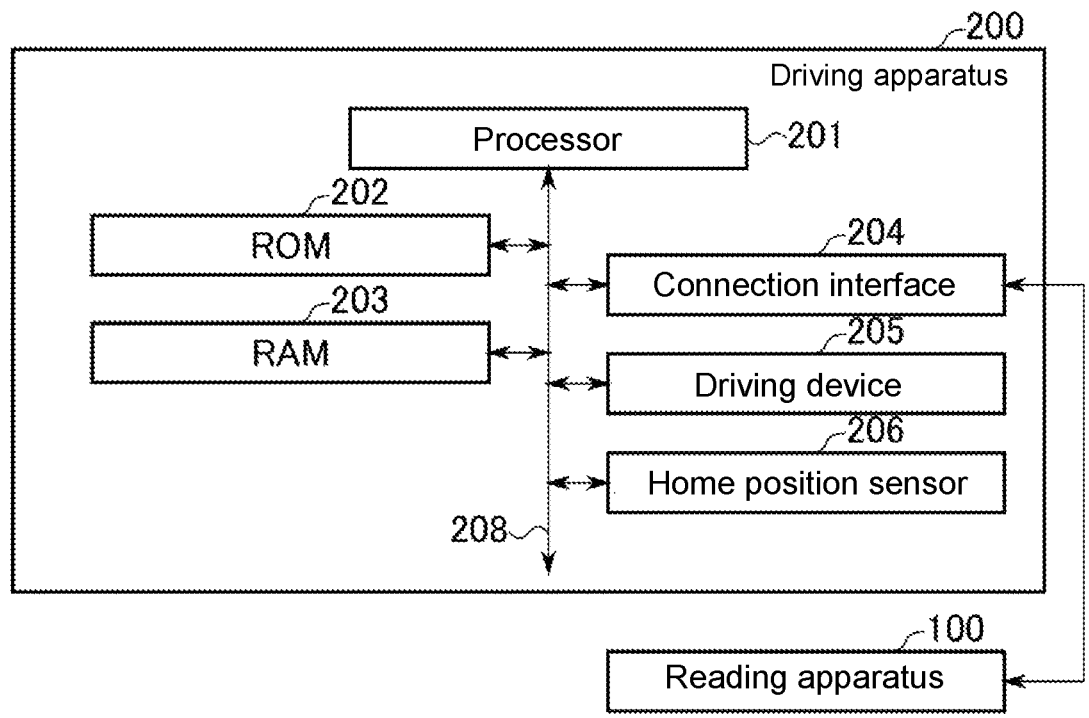
FIG. 4 is a block diagram showing an example of a driving apparatus according to the embodiment.

The driving apparatus 200 will be described with reference to FIGS. 4 and 5. FIG. 4 is a block diagram showing an example of a configuration of the driving apparatus 200. The driving apparatus 200 includes a processor 201, a ROM 202, a RAM 203, a connection interface 204, a driving device 205, and a home position sensor 206. The respective parts included in the driving apparatus 200 are connected via the bus 208 or the like.

The processor 201 corresponds to a central part of a computer that performs processes such as arithmetic operation and control required for the operation of the driving apparatus 200. The processor 201 puts various programs stored in the ROM 202 or the like into the RAM 203. The processor 201 executes various operations by executing the programs loaded to the RAM 203. The processor 201 is a CPU, an MPU, a SoC, a DSP, a GPU, an ASIC, a PLD, an FPGA or the like. The processor 201 may be a combination of some of them.

The ROM 202 corresponds to a main storage apparatus of the computer using the processor 201 as the central part. The ROM 202 is a nonvolatile memory mainly used for reading data. The ROM 202 stores the above-mentioned programs. The ROM 202 stores data, various setting values, and the like to use when the processor 201 performs various processes.

The RAM 203 corresponds to a main storage apparatus of the computer using the processor 201 as the central part. The RAM 203 is a memory used for reading and writing data. The RAM 203 is a work area for temporarily storing data to use when the processor 201 performs various processes.

The connection interface 204 is an interface for connecting the driving apparatus 200 to the reading apparatus 100.

The driving device 205 moves the antenna 300. For example, the driving device 205 is a stepping motor.

The home position sensor 206 is a sensor that detects whether or not a movement stage 213 to be described later is at the home position.

The bus 208 includes a control bus, an address bus, a data bus, and the like. The bus 208 transmits a signal exchanged between the respective parts of the driving apparatus 200.

Figure 5:
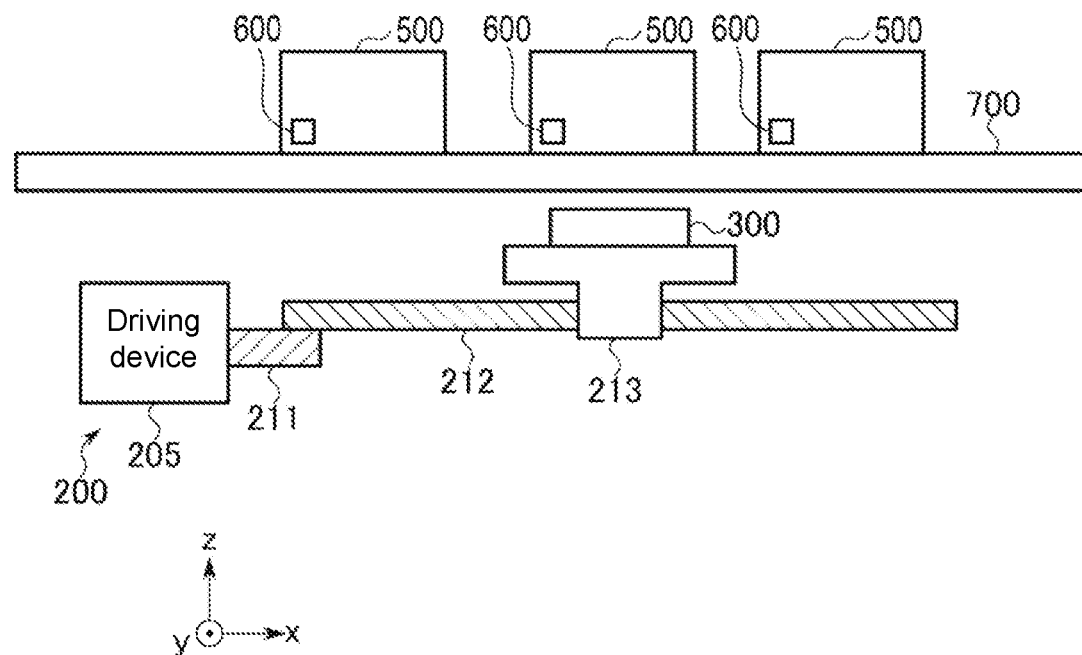
FIG. 5 is a schematic view for describing the driving apparatus according to the embodiment.

FIG. 5 is a schematic view for describing the driving apparatus 200. The driving apparatus 200 includes a rotation shaft 211, a rail 212, and the movement stage 213.

As illustrated in FIG. 5, the driving apparatus 200 and the antenna 300 is arranged below the counter table 700. The counter table 700 is a table having a horizontal surface on which the article 500 to which the wireless tag 600 has been attached is placed. The counter table 700 is an example of a placement portion. the counter table 700 may be included in the communication system 1 or the communication apparatus 10.

The rotation shaft 211 transmits driving force of the driving device 205. Thread grooves are formed in the rotation shaft 211 and the rail 212. The thread grooves of the rail 212 face and are coupled with the thread grooves of the rotation shaft 211. Therefore, when the driving device 205 is rotationally driven, the rotation shaft 211 rotates and the rail 212 moves (rotates). The movement stage 213 on which the antenna 300 is placed is mounted on the rail 212.

The movement stage 213 has a ball screw nut. When the rail 212 rotates through the ball screw nut, the movement stage 213 moves horizontally. That is, the movement stage 213 moves in a direction along the x-axis shown in FIG. 5. Further, when the rail 212 rotates in an opposite direction, the movement stage 213 moves in an opposite direction. In this manner, the driving apparatus 200 reciprocally moves the antenna 300 along the rail 212 in one direction of the x-axis.

It should be noted that a hardware configuration of the driving apparatus 200 is not limited to the above-mentioned configuration. For example, in the embodiment described above, the antenna 300 is moved in the one-axis direction by the driving apparatus 200, but in a modified example of the embodiment, the antenna 300 may be moved in a direction of two or more, or the antenna 300 may be rotated. As to the driving apparatus 200, the above-mentioned components can be omitted or modified or new components can be added as appropriate.

Figure 6:
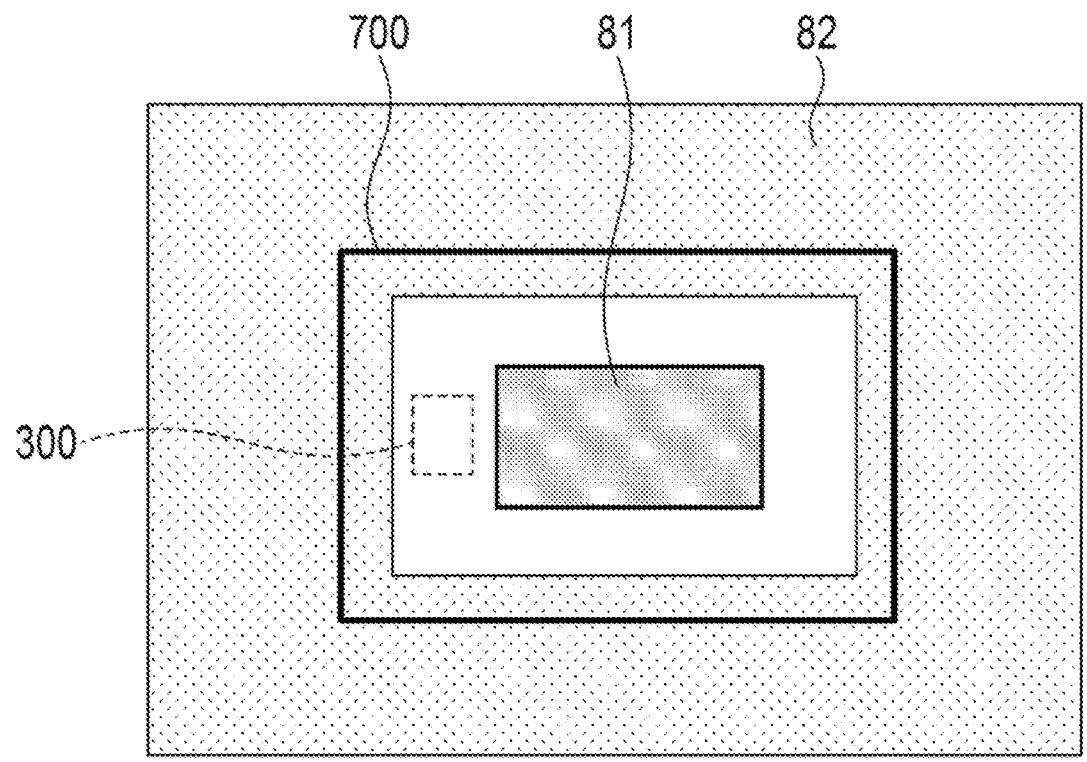
FIG. 6 is a schematic view for describing a first range and a second range according to the embodiment.

The first range and the second range will be described. FIG. 6 is a schematic view for describing a first range 81 and a second range 82, and is a plan view as the counter table 700 is viewed from above.

The first range 81 and the second range 82 are ranges separated horizontally. The first range 81 is a range set at a central portion of the horizontal surface of the counter table 700. The second range 82 is a range set in an outer peripheral portion of the horizontal surface of the counter table 700 and outside the counter table 700 horizontally. The second range 82 is set to surround the first range 81. Although the second range 82 is set not to be adjacent to the first range 81 but to be spaced apart from the first range 81 in FIG. 6, it is not limited thereto. The second range 82 may be adjacent to the first range 81.

It should be noted that settings of the first range 81 and the second range 82 are not limited thereto. The first range 81 may be a range set in the central portion of the horizontal surface of the counter table 700 and the second range 82 may be a range set in the outer peripheral portion of the horizontal surface of the counter table 700. The first range 81 may be a range set in the entire horizontal surface of the counter table 700 and the second range 82 may be a range set outside the counter table 700 horizontally. The second range 82 is not limited to the range set to surround the first range 81.

The first range 81 and the second range 82 only need to be different ranges not overlapping each other, and are not limited to the ranges separated horizontally. The first range 81 and the second range 82 may be ranges separated vertically.

Figure 7:
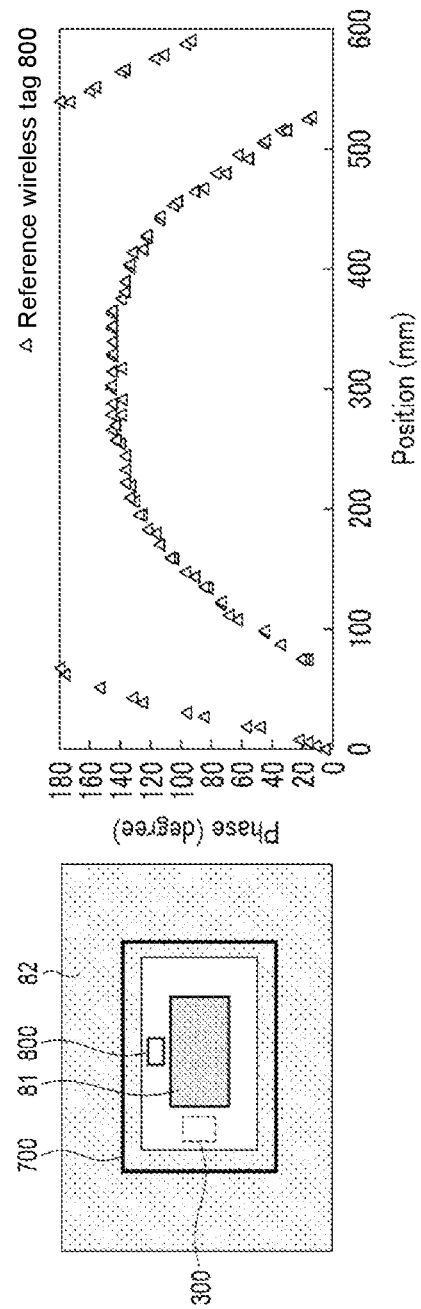
FIG. 7 is a diagram for describing comparative reference tag data depending on an environment in which a metal item is arranged with respect to a communication apparatus according to the embodiment.

Next, an example of the reference tag data will be described. FIG. 7 is a diagram for describing the reference tag data the environment in which the metal item is arranged with respect to the communication apparatus 10.

The left view of FIG. 7 is a diagram showing an arrangement example of a reference wireless tag 800 and is a plan view as the counter table 700 is viewed from above. The reference wireless tag 800 is arranged at a predetermined position on the counter table 700. For example, the predetermined position may be inside the first range 81 and may be a center position L/2 of the scanning range of the antenna 300. The predetermined position may be inside the second range 82. The predetermined position can be set as appropriate.

The reference tag data set will be described. Here, the description will be given using the phase data as an example of the reference tag data. The right view of FIG. 7 is a graph showing an example of the plurality of pieces of reference tag data of the reference wireless tag 800 at the plurality of positions of the antenna 300 included in the reference tag data set. The horizontal axis denotes the position of the antenna 300. It is assumed that the position L is 600 mm. The vertical axis denotes the phase. The graph shows a phase at each of the positions in the constant intervals a between the position 0 to the position L. The phase of the reference wireless tag 800 varies as the position of the antenna 300 changes. It is because the distance between the antenna 300 and the reference wireless tag 800 changes as the antenna 300 moves.

The processor 101 of the reading apparatus 100 sequentially acquires the reference tag data of the reference wireless tag 800 at the plurality of positions of the antenna 300. For example, the plurality of positions of the antenna 300 includes, as described above, the positions in the constant intervals a between the position 0 to the position L. The plurality of positions of the antenna 300 may include one or more positions different from the positions in the constant intervals a between the position 0 to the position L. The processor 101 stores the acquired reference tag data in the reference tag data storage area 1111. The plurality of pieces of reference tag data of the reference wireless tag 800 at the plurality of positions of the antenna 300 configures the reference tag data set.

Figure 8:
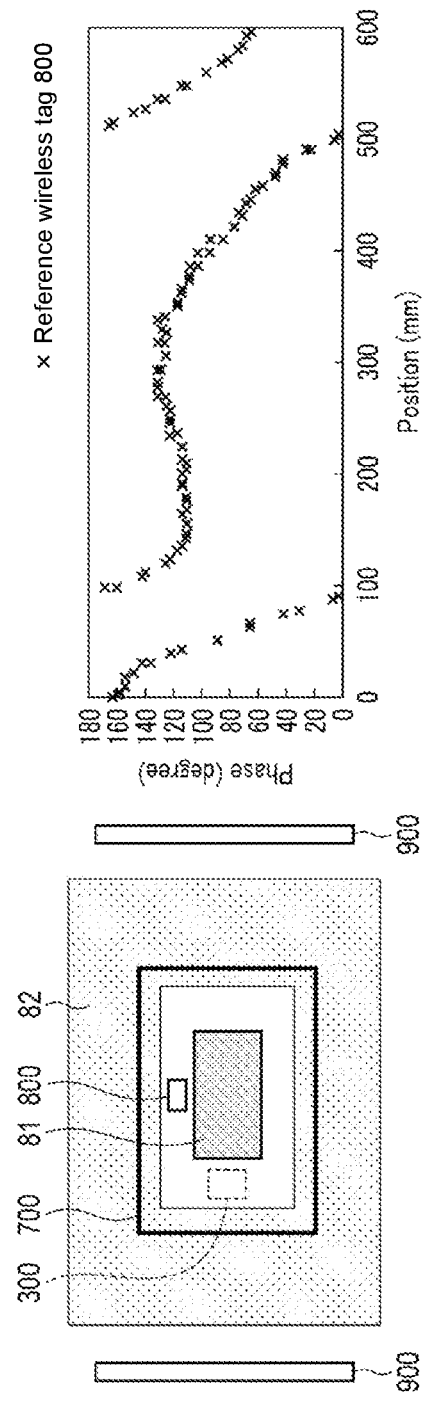
FIG. 8 is a diagram for describing the comparative reference tag data depending on the environment in which the metal item is arranged with respect to the communication apparatus according to the embodiment.

FIG. 8 is a diagram for describing the reference tag data the environment in which the metal item is arranged with respect to the communication apparatus 10. The left view of FIG. 8 is a diagram showing an arrangement example of the reference wireless tag 800 and is a plan view as the counter table 700 is viewed from above. The reference wireless tag 800 is arranged at a predetermined position on the counter table 700 as in the example of FIG. 7. Two metal plates 900 are arranged around the communication apparatus 10.

The reference tag data set will be described. Here, the description will be given using the phase data as an example of the reference tag data. The right view of FIG. 8 is a graph showing an example of the plurality of pieces of reference tag data of the reference wireless tag 800 at the plurality of positions of the antenna 300 included in the reference tag data set. The horizontal axis denotes the position of the antenna 300. It is assumed that the position L is 600 mm. The vertical axis denotes the phase. The graph shows a phase at each of the positions in the constant intervals a between the position 0 to the position L. Comparing FIG. 7 with FIG. 8, the pattern of the reference tag data set differs due to influence of the metal plates 900. Since the reference tag data set is measured by the communication apparatus 10, the reference tag data set differs depending on the environment of the communication apparatus 10 in this manner. For example, the reference tag data set differs depending on the presence/absence of the metal item with respect to the communication apparatus 10. The reference tag data set differs depending on the distance between the communication apparatus 10 and the metal item also in the environment in which the metal item is arranged with respect to the communication apparatus 10. The reference tag data set differs depending on the position of the metal item with respect to the communication apparatus 10 also in the environment in which the metal item is arranged with respect to the communication apparatus 10.

Next, a selection process by the processor 101 of the reading apparatus 100 configured in the above-mentioned manner will be described. The selection process is a process of selecting one learned model from the plurality of learned models in a manner that depends on the environment of the communication apparatus 10.

Figure 9:
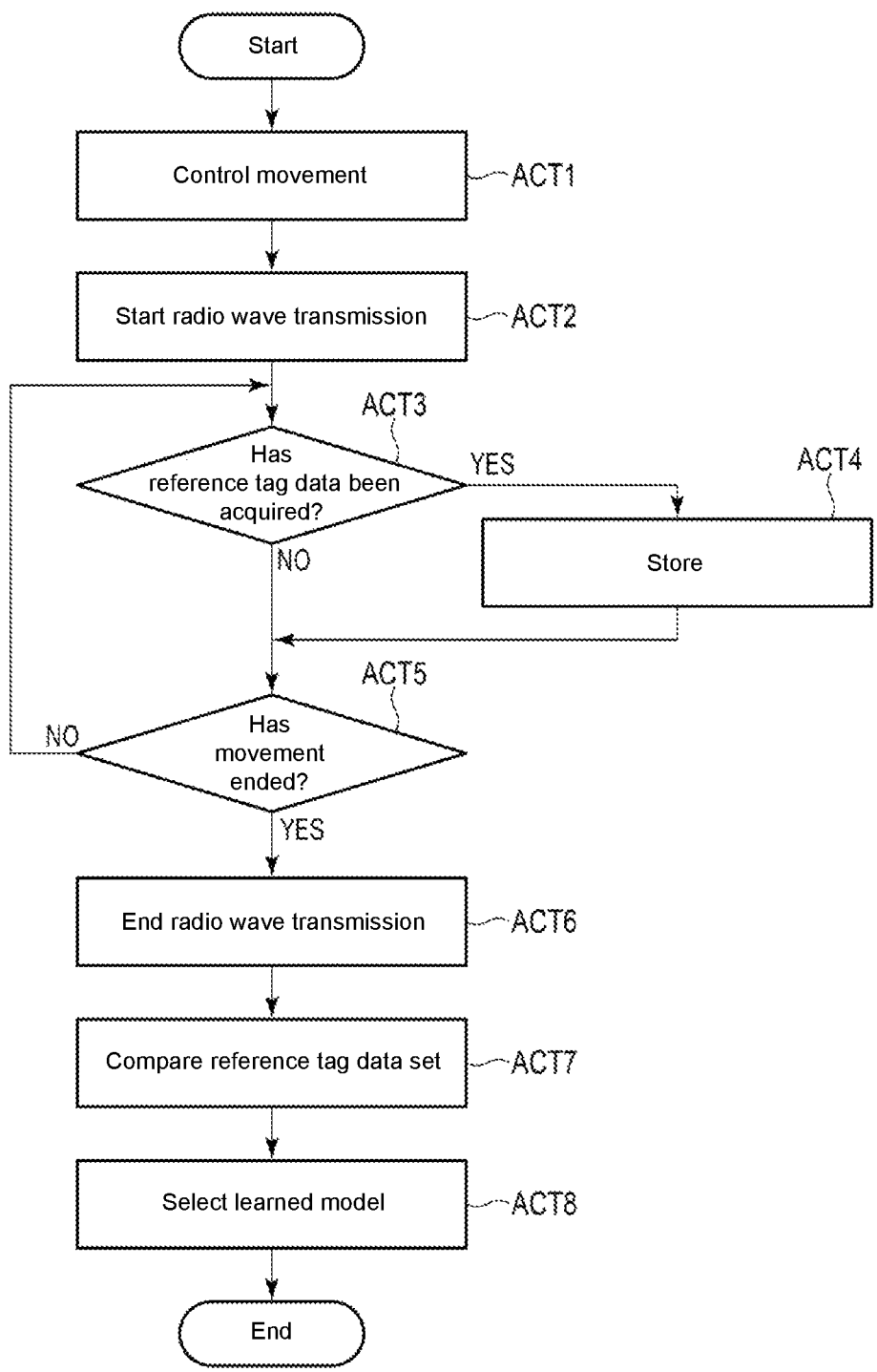
FIG. 9 is a flowchart showing an example of a selection process by a processor of the reading apparatus according to the embodiment.

FIG. 9 is a flowchart showing an example of the selection process by the processor 101 of the reading apparatus 100. It should be noted that a procedure of processes to be described below is merely an example, and each process may be changed as long as it is possible. Further, as to the procedure of processes to be described below, steps can be omitted, substituted, or added as appropriate in accordance with the embodiment.

For example, it is assumed that the reference wireless tag 800 is arranged at a predetermined position on the counter table 700. The processor 101 of the reading apparatus 100 may start the selection process in accordance with acquisition of an instruction to start the selection process that the user has inputted through the terminal 400. The user is able to input the instruction to start the selection process through the terminal 400 at an arbitrary timing. The user may input the instruction to start the selection process through the terminal 400 when the communication apparatus 10 is installed. The user may input the instruction to start the selection process through the terminal 400 when the environment of the communication apparatus 10 changes, e.g., in installation of the metal plates 900.

In ACT 1 of FIG. 9, the movement control unit 1011 of the processor 101 controls the movement of the antenna 300. For example, the movement control unit 1011 sends a movement instruction to the driving apparatus 200. The movement instruction is an instruction to move the antenna 300 in one direction from the position 0 corresponding to the home position to the position L.

The processor 201 of the driving apparatus 200 receives the movement instruction from the reading apparatus 100. Following the movement instruction, the processor 201 determines whether or not the antenna 300 is at the home position by using the home position sensor 206. In a case where the antenna 300 is not at the home position, the processor 201 controls the driving device 205 to move the antenna 300 to the home position. Under the control of the processor 201, the driving device 205 moves the antenna 300 to the home position. The processor 201 controls the driving device 205 to start the movement of the antenna 300 from the position 0 corresponding to the home position. Under the control of the processor 201, the driving device 205 starts the movement of the antenna 300 from the position 0. The processor 201 controls the driving device 205 to move the antenna 300 in one direction from the position 0 to the position L. Under the control of the processor 201, the driving device 205 moves the antenna 300 in one direction from the position 0 to the position L.

In ACT 2 of FIG. 9, the communication control unit 1012 of the processor 101 controls the start of radio wave transmission from the antenna 300. For example, the communication control unit 1012 controls the start of radio wave transmission from the antenna 300 on the basis of the start of the movement of the antenna 300 from the position 0. On the basis of a movement start notification from the driving apparatus 200, the communication control unit 1012 may control the start of radio wave transmission from the antenna 300. The movement start notification may indicate that the movement of the antenna 300 from the position 0 has started. The antenna 300 starts radio wave transmission.

Next, in ACT 3, the first acquisition unit 1013 of the processor 101 determines whether or not the reference tag data of the reference wireless tag 800 has been acquired. For example, the first acquisition unit 1013 of the processor 101 acquires the reference tag data of the reference wireless tag 800, which has been detected by the demodulator 110. In a case where the first acquisition unit 1013 of the processor 101 determines that the first acquisition unit 1013 has acquired the reference tag data (YES in ACT 3), the process of the processor 101 shifts from ACT 3 to ACT 4. In a case where the first acquisition unit 1013 of the processor 101 determines that the first acquisition unit 1013 has not acquired the reference tag data (NO in ACT 3), the process of the processor 101 shifts from ACT 3 to ACT 5.

In ACT 4, the first acquisition unit 1013 of the processor 101 stores the reference tag data in the reference tag data storage area 1111 in accordance with acquisition of the reference tag data of the reference wireless tag 800.

In ACT 5, the communication control unit 1012 of the processor 101 determines whether or not the movement of the antenna 300 has ended. For example, the communication control unit 1012 determines whether or not the movement of the antenna 300 from the position 0 to the position L has ended. The communication control unit 1012 may determine that the movement of the antenna 300 has ended on the basis of a movement end notification from the driving apparatus 200. The movement end notification may indicate that the movement of the antenna 300 has ended by reaching the position L. In a case where the communication control unit 1012 determines that the movement of the antenna 300 has ended (YES in ACT 5), the process of the processor 101 shifts from ACT 5 to ACT 6. In a case where the communication control unit 1012 determines that the movement of the antenna 300 has ended (NO in ACT 5), the process of the processor 101 shifts from ACT 5 to ACT 3.

The first acquisition unit 1013 of the processor 101 repeats the processes of ACT 3 and ACT 4 until the antenna 300 ends the movement at the position L after the antenna 300 starts the movement at the position 0. The movement of the antenna 300 from the position 0 to the position L is an example of the movement of the antenna 300 associated with a single measurement process.

The first acquisition unit 1013 of the processor 101 acquires the reference tag data set depending on the environment of the communication apparatus 10 by repeating the process of ACT 3. For example, the first acquisition unit 1013 sequentially acquires the reference tag data at some of or all the plurality of positions of the antenna 300 with respect to the reference wireless tag 800. The first acquisition unit 1013 may acquire the reference tag data at some or all of the positions in the constant intervals a between the position 0 to the position L with respect to the reference wireless tag 800. The first acquisition unit 1013 is capable of acquiring the position of the antenna 300 in cooperation with the driving apparatus 200.

The first acquisition unit 1013 of the processor 101 stores the reference tag data set in the reference tag data storage area 1111 by repeating the process of ACT 4. For example, the first acquisition unit 1013 stores the reference tag data in the reference tag data storage area 1111 every time the first acquisition unit 1013 acquires the reference tag data with respect to the reference wireless tag 800. The first acquisition unit 1013 stores the reference tag data in the reference tag data storage area 1111 in association with the position of the antenna 300. The first acquisition unit 1013 may store in the reference tag data storage area 1111 the reference tag data at some or all of the positions in the constant intervals a between the position 0 to the position L.

In ACT 6, the communication control unit 1012 of the processor 101 controls the end of radio wave transmission from the antenna 300. For example, the communication control unit 1012 controls the end of radio wave transmission from the antenna 300 on the basis of the end of the movement of the antenna 300 from the position 0 to the position L. The antenna 300 ends radio wave transmission.

Next, in ACT 7, the selection unit 1018 of the processor 101 compares the reference tag data set with the plurality of comparative reference tag data sets. For example, the selection unit 1018 acquires the reference tag data set from the reference tag data storage area 1111. The selection unit 1018 compares the reference tag data set with the plurality of comparative reference tag data sets stored in the comparative reference tag data storage area 1112.

On the basis of the comparison, the selection unit 1018 of the processor 101 selects one comparative reference tag data set from the plurality of comparative reference tag data sets. Selecting the comparative reference tag data set on the basis of the comparison is an example of selecting the comparative reference tag data set on the basis of the reference tag data set. For example, the selection unit 1018 selects a comparative reference tag data set related to the environment of the communication apparatus 10 that is the closest to the environment of the communication apparatus 10 that is related to the reference tag data set. The environment of the communication apparatus 10 that is related to the reference tag data set is the environment of the communication apparatus 10 where the plurality of pieces of reference tag data included in the reference tag data set have been measured. The environment of the communication apparatus 10 that is related to the comparative reference tag data set is the environment of the communication apparatus 10 where the plurality of pieces of comparative reference tag data included in the comparative reference tag data set have been measured. The selection unit 1018 may select a comparative reference tag data set that is the most correlated to the reference tag data set from the plurality of comparative reference tag data sets. The environment of the communication apparatus 10 that is related to the comparative reference tag data set that is the most correlated to the reference tag data set is the closest to the environment of the communication apparatus 10 that is related to the reference tag data set.

Next, in ACT 8, the selection unit 1018 of the processor 101 selects a learned model from the plurality of learned models in a manner that depends on the environment of the communication apparatus 10. For example, the selection unit 1018 selects, from the plurality of learned models, a learned model associated with the selected comparative reference tag data set. The selection unit 1018 sets the selected learned model as a learned model to use.

As described above, the selection unit 1018 of the processor 101 selects the comparative reference tag data set on the basis of the comparison of the reference tag data set with the plurality of comparative reference tag data sets. Therefore, selecting the learned model associated with the selected comparative reference tag data set is an example of selecting the learned model on the basis of the comparison. In this example, the selection unit 1018 selects a learned model from the plurality of learned models on the basis of the comparison of the reference tag data set with the plurality of comparative reference tag data sets.

As described above, selecting the comparative reference tag data set on the basis of the comparison is an example of selecting the comparative reference tag data set on the basis of the reference tag data set. Therefore, selecting the learned model on the basis of the comparison is an example of selecting the learned model on the basis of the reference tag data set. In this example, the selection unit 1018 of the processor 101 selects the learned model from the plurality of learned models on the basis of the reference tag data set.

As described above, the reference tag data set differs depending on the environment of the communication apparatus 10. Therefore, selecting the learned model on the basis of the reference tag data set is an example of selecting the learned model in a manner that depends on the environment of the communication apparatus 10 that is related to the reference tag data set. In this example, the selection unit 1018 selects the learned model from the plurality of learned models in a manner that depends on the environment of the communication apparatus 10.

Next, a determination process by the processor 101 of the reading apparatus 100 configured in the above-mentioned manner will be described. The determination process is a process of acquiring the data indicating the range in which each wireless tag 600 that is the determination target is present.

Figure 10:
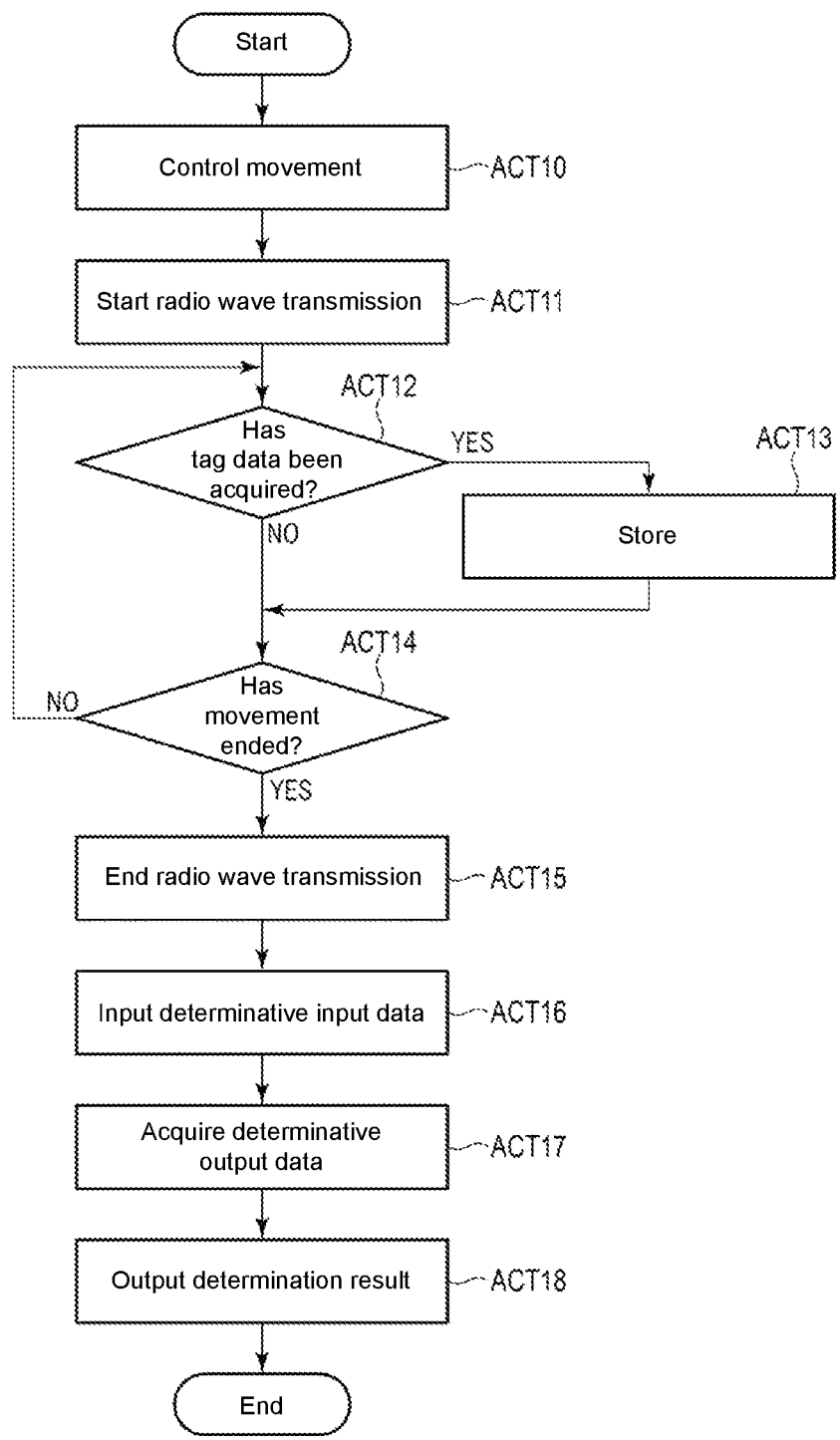
FIG. 10 is a flowchart showing an example of a determination process by the processor of the reading apparatus according to the embodiment.

FIG. 10 is a flowchart showing an example of the determination process by the processor 101 of the reading apparatus 100. It should be noted that a procedure of processes to be described below is merely an example, and each process may be changed as long as it is possible. Further, as to the procedure of processes to be described below, steps can be omitted, substituted, or added as appropriate in accordance with the embodiment.

For example, it is assumed that the article 500 that is a target for reading information stored in the wireless tag 600 is placed on the counter table 700. The wireless tag 600 attached to the article 500 placed on the counter table 700 can be the wireless tag 600 that is the determination target. An article that is not the target for reading information stored in the wireless tag 600 can be present in vicinity of the counter table 700. The wireless tag 600 attached to the article present in vicinity of the counter table 700 can be the wireless tag 600 that is the determination target.

The processor 101 of the reading apparatus 100 may start the determination process in accordance with acquisition of an instruction to start the determination process that the user has inputted through the terminal 400.

In ACT 10 of FIG. 10, the movement control unit 1011 of the processor 101 controls the movement of the antenna 300. The process of ACT 10 may be similar to the process of ACT 1.

In ACT 11, the communication control unit 1012 of the processor 101 controls the start of radio wave transmission from the antenna 300. The process of ACT 11 may be similar to the process of ACT 2.

In ACT 12, the first acquisition unit 1013 of the processor 101 determines whether or not the determinative tag data of each wireless tag 600 that is the determination target has been acquired. The first acquisition unit 1013 acquires the determinative tag data of each wireless tag 600 that is the determination target, which has been detected by the demodulator 110. In a case where the first acquisition unit 1013 of the processor 101 determines that the first acquisition unit 1013 has acquired the determinative tag data (YES in ACT 12), the process of the processor 101 shifts from ACT 12 to ACT 13. In a case where the first acquisition unit 1013 of the processor 101 determines that the first acquisition unit 1013 has not acquired the determinative tag data (NO in ACT 12), the process of the processor 101 shifts from ACT 12 to ACT 14.

In ACT 12, the first acquisition unit 1013 of the processor 101 stores the determinative tag data in the measurement data storage area 1113 in accordance with acquisition of the determinative tag data of each wireless tag 600 that is the determination target.

In ACT 14, the communication control unit 1012 of the processor 101 determines whether or not the movement of the antenna 300 has ended. The process of ACT 14 may be similar to the process of ACT 5. In a case where the communication control unit 1012 determines that the movement of the antenna 300 has ended (YES in ACT 14), the process of the processor 101 shifts from ACT 14 to ACT 15. In a case where the communication control unit 1012 determines that the movement of the antenna 300 has not ended (NO in ACT 14), the process of the processor 101 shifts from ACT 14 to ACT 12.

The first acquisition unit 1013 of the processor 101 repeats the processes of ACT 12 and ACT 13 until the antenna 300 ends the movement at the position L after the antenna 300 starts the movement at the position 0.

The first acquisition unit 1013 of the processor 101 acquires the plurality of determinative tag data sets by repeating the process of ACT 12. For example, the first acquisition unit 1013 sequentially acquires the determinative tag data at some of or all the plurality of positions of the antenna 300 with respect to each wireless tag 600 that is the determination target. The first acquisition unit 1013 may sequentially acquire the determinative tag data at some or all of the positions in the constant intervals a between the position 0 to the position L. The number of positions of the determinative tag data measured by the communication apparatus 10 can be the same or different for each wireless tag 600 that is the determination target. The first acquisition unit 1013 is capable of acquiring the position of the antenna 300 in cooperation with the driving apparatus 200.

The first acquisition unit 1013 of the processor 101 stores the plurality of determinative tag data sets in the measurement data storage area 1113 by repeating the process of ACT 13. For example, the first acquisition unit 1013 stores the determinative tag data in the measurement data storage area 1113 every time the first acquisition unit 1013 acquires the determinative tag data with respect to each wireless tag 600 that is the determination target. The first acquisition unit 1013 stores the determinative tag data in the measurement data storage area 1113 in association with the position of the antenna 300. The first acquisition unit 1013 may store the determinative tag data in the measurement data storage area 1113 at some or all of the positions in the constant intervals a between the position 0 to the position L.

In ACT 15, the communication control unit 1012 of the processor 101 controls the end of radio wave transmission from the antenna 300. The process of ACT 15 may be similar to the process of ACT 6.

In ACT 16, the input unit 1014 of the processor 101 inputs the determinative input data into the learned model selected from the plurality of learned models by the selection unit 1018 in a manner that depends on the environment of the communication apparatus 10. For example, the input unit 1014 acquires the determinative input data on the basis of the measurement data stored in the measurement data storage area 1113. The input unit 1014 inputs the acquired determinative input data into the learned model selected by the selection unit 1018.

In ACT 17, the second acquisition unit 1015 of the processor 101 acquires the determinative output data from the learned model on the basis of the input of the determinative input data into the learned model by the input unit 1014.

In ACT 18, the output unit 1016 of the processor 101 outputs to the terminal 400 a determination result including the determinative output data acquired by the second acquisition unit 1015. The determination result may include information stored in each wireless tag 600 that is the determination target read by the reading apparatus 100. The terminal 400 may process the information stored in each wireless tag 600 that is the determination target in a manner that depends on whether each wireless tag 600 that is the determination target is included in the first range or the second range. The terminal 400 may process information stored in each wireless tag 600 that is the determination target, which is included in the first range. The terminal 400 does not need to process information stored in each wireless tag 600 that is the determination target, which is included in the second range. Further, the selection process of the learned model shown in FIG. 9 and the determination process of the learned model shown in FIG. 10 may be performed collectively. In this case, for example, the process of ACT 16 to ACT 18 in FIG. 10 is performed after the process of ACT 1 to ACT 8 in FIG. 9.

A measurement example for the learning tag data included in the learning data that is used for generating the learned model will be described. Here, a measurement example for learning tag data included in learning data of a plurality of pieces of learning data, which depends on the environment in which the metal item is not arranged with respect to the communication apparatus 10, will be described. A measurement example for learning tag data included in the other learning data may be similar thereto, and the description will be omitted.

Figure 11:
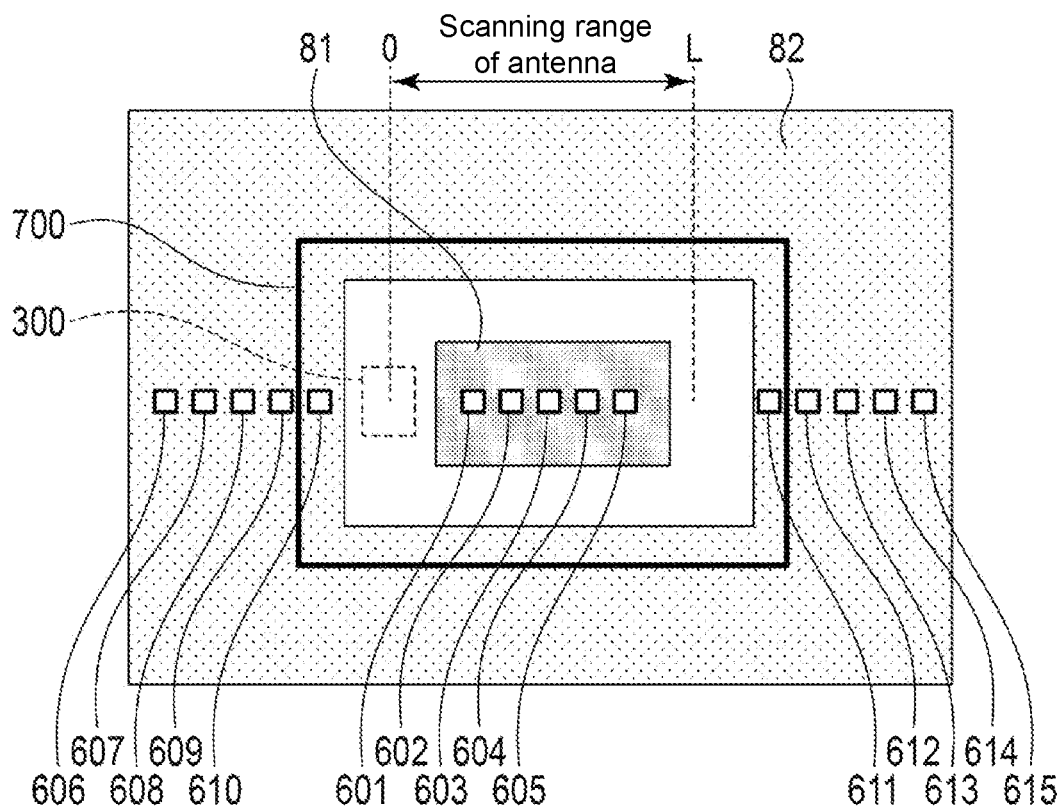
FIG. 11 is a diagram showing an arrangement example of wireless tags that are a plurality of learning targets according to the embodiment.

FIG. 11 is a diagram showing an arrangement example of wireless tags 601 to 615 that are a plurality of learning targets, and is a plan view as the counter table 700 is viewed from above. The wireless tags 601 to 615 that are the plurality of learning targets are examples of the wireless tag 600.

The wireless tags 601 to 615 are arranged on a virtual plane including the horizontal surface of the counter table 700 so as to be vertically parallel to one direction in which the antenna 300 moves. The wireless tags 601 to 605 are arranged at different positions so as to be included in the first range 81. The wireless tags 601 to 605 are arranged in the stated order so as to be further from the position 0. The antenna 300 passes through positions corresponding to the respective wireless tags in the order of the wireless tags 601 to 605 during movement from the position 0 to the position L.

The wireless tags 606 to 610 are arranged at different positions so as to be included in the second range 82. The wireless tags 606 to 610 are arranged in the stated order so as to be closer to the position 0. The antenna 300 moves away from the wireless tags 606 to 610 during movement from the position 0 to the position L.

The wireless tags 611 to 615 are arranged at different positions so as to be included in the second range 82. The wireless tags 611 to 615 are arranged in the stated order so as to be further from the position L. The antenna 300 moves closer to the wireless tags 611 to 615 during movement from the position 0 to the position L.

It should be noted that the number of wireless tags that are the plurality of learning targets and the arrangement example of the wireless tags are not limited to the example shown in FIG. 11. It is sufficient that some of the wireless tags that are the plurality of learning targets are arranged in the first range 81 and the rest of the wireless tags that are the plurality of learning targets is arranged in the second range 82.

The plurality of pieces of learning tag data of the wireless tags 601 to 615 in the plurality of positions of the antenna 300 will be described. Here, the description will be given using the phase data as an example of the learning tag data.

Figure 12:
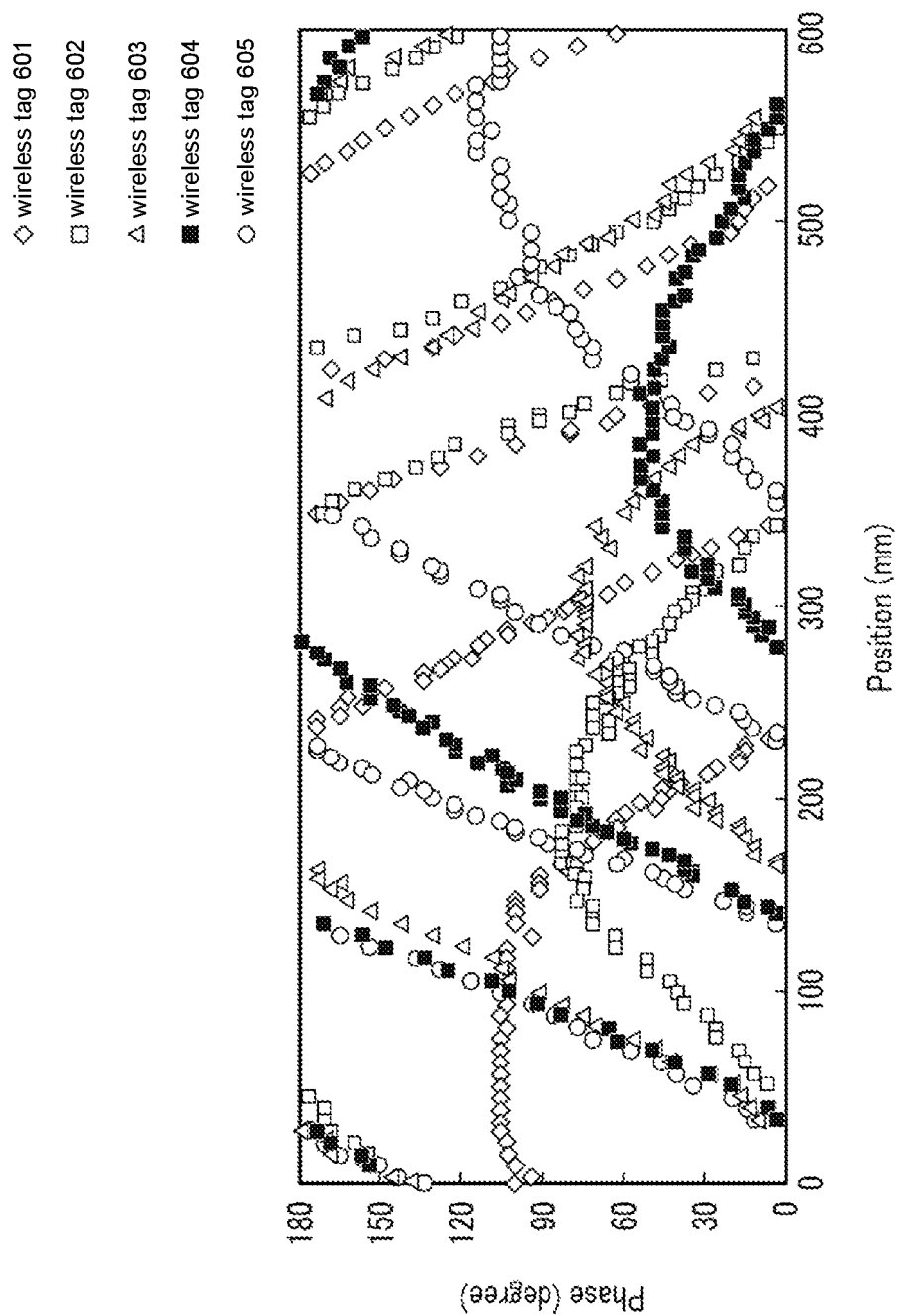
FIG. 12 is a graph showing an example of learning tag data according to the embodiment.

FIG. 12 is a graph showing an example of the plurality of pieces of learning tag data of the wireless tags 601 to 605 at the plurality of positions of the antenna 300. The horizontal axis denotes the position of the antenna 300. It is assumed that the position L is 600 mm. The vertical axis denotes the phase. The graph shows a phase at each of the positions in the constant intervals a between the position 0 to the position L with respect to each of the wireless tags 601 to 605.

The phase of each of the wireless tags 601 to 605 varies as the position of the antenna 300 changes. It is because the distance between the antenna 300 and each of the wireless tags 601 to 605 changes as the antenna 300 moves. Irrespective of where the antenna 300 is located, the phase of each of the wireless tags 601 to 605 is different. It is because the distance between the antenna 300 and each of the wireless tags 601 to 605 is different.

Figure 13:
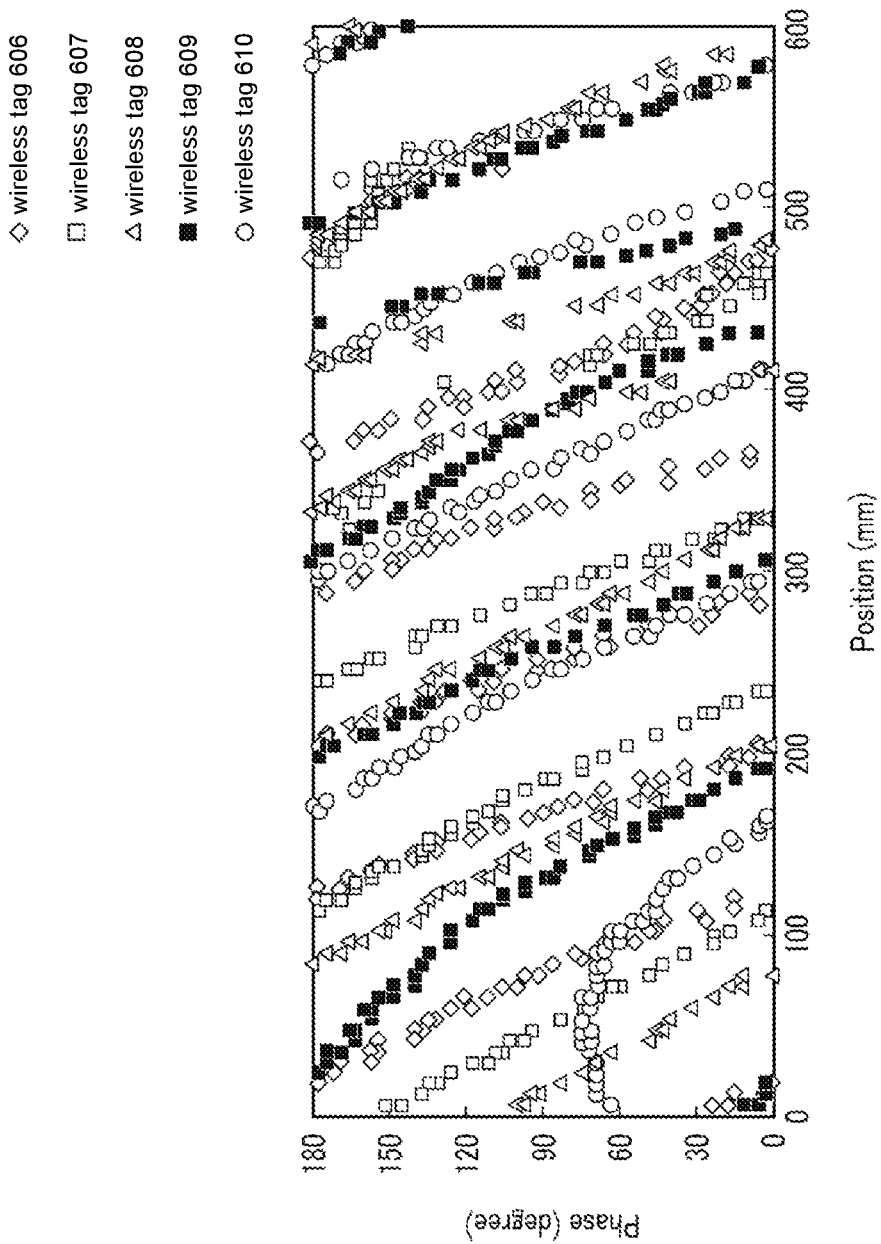
FIG. 13 is a graph showing another example of the learning tag data according to the embodiment.

FIG. 13 is a graph showing an example of the plurality of pieces of learning tag data of the wireless tags 606 to 610 at the plurality of positions of the antenna 300. The horizontal axis denotes the position of the antenna 300. It is assumed that the position L is 600 mm. The vertical axis denotes the phase. The graph shows a phase at each of the positions in the constant intervals a between the position 0 to the position L with respect to each of the wireless tags 606 to 610.

The phase of each of the wireless tags 606 to 610 varies as the position of the antenna 300 changes. Irrespective of where the antenna 300 is located, the phase of each of the wireless tags 606 to 610 is different.

Figure 14:
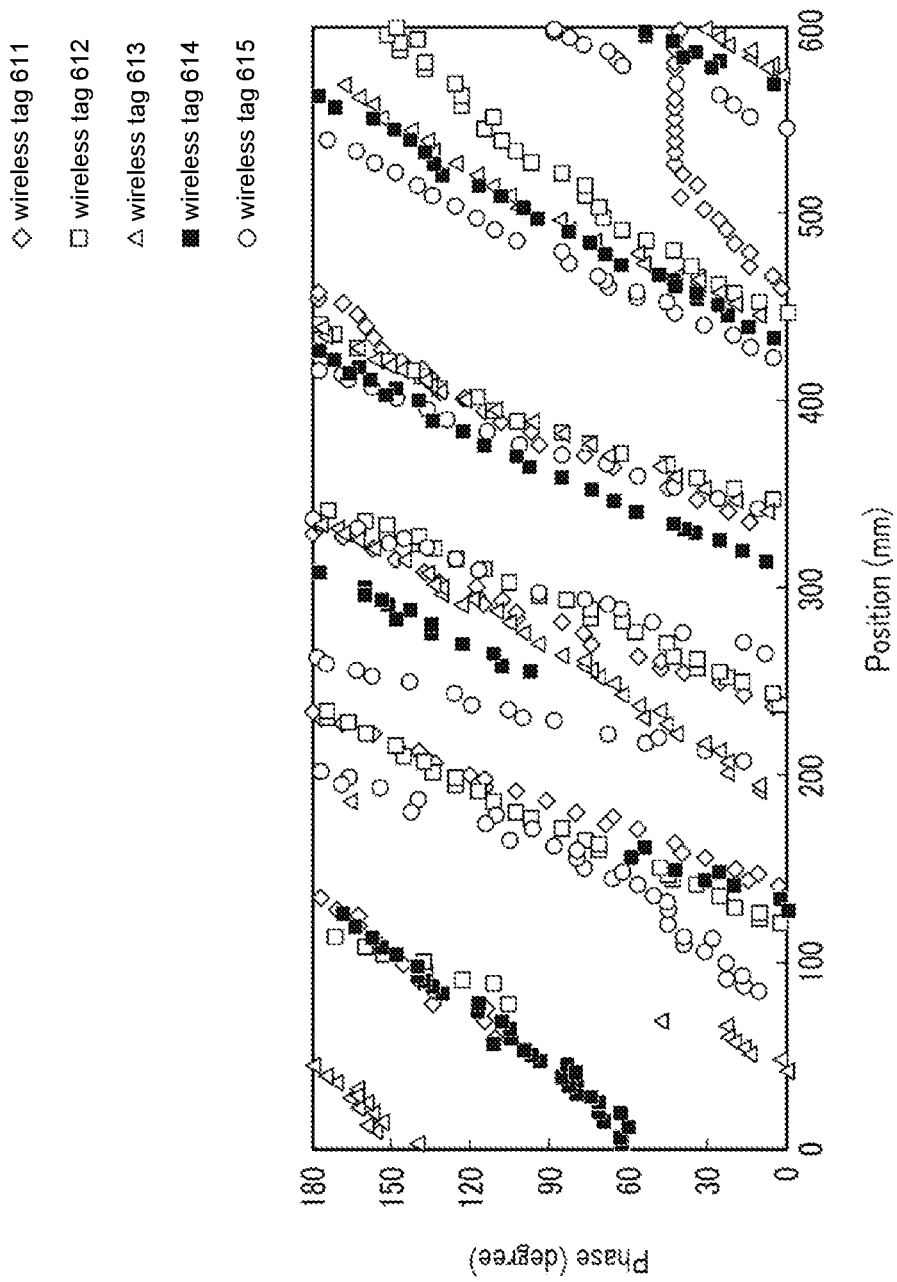
FIG. 14 is a graph showing still another example of the learning tag data according to the embodiment.

FIG. 14 is a graph showing an example of the plurality of pieces of learning tag data of the wireless tags 611 to 615 in the plurality of positions of the antenna 300. The horizontal axis denotes the position of the antenna 300. It is assumed that the position L is 600 mm. The vertical axis denotes the phase. The graph shows a phase at each of the positions in the constant intervals a between the position 0 to the position L with respect to each of the wireless tags 611 to 615.

The phase of each of the wireless tags 611 to 615 varies as the position of the antenna 300 changes. Irrespective of where the antenna 300 is located, the phase of each of the wireless tags 611 to 615 is different.

Although the characteristics of the phase data have been described, the same applies to characteristics of the received signal strength indicator data. The received signal strength indicator of each of the wireless tags 601 to 615 varies as the position of the antenna 300 changes. It is because the distance between the antenna 300 and each of the wireless tags 601 to 615 changes as the antenna 300 moves. Irrespective of where the antenna 300 is located, the received signal strength indicator of each of the wireless tags 601 to 615 is different. It is because the distance between the antenna 300 and each of the wireless tags 601 to 615 is different.

As described above, the processor 101 of the reading apparatus 100 acquires the plurality of pieces of learning tag data of the wireless tags 600 that are the plurality of learning targets at the plurality of positions of the antenna 300. Accordingly, the processor 101 of the reading apparatus 100 acquires a plurality of data sets with respect to the wireless tags 600 that are the plurality of learning targets. For example, the plurality of positions of the antenna 300 includes, as described above, the positions in the constant intervals a between the position 0 to the position L. The plurality of positions of the antenna 300 may include one or more positions different from the positions in the constant intervals a between the position 0 to the position L. The processor 101 stores the acquired learning tag data in the learning data storage area 1114.

Figure 15:
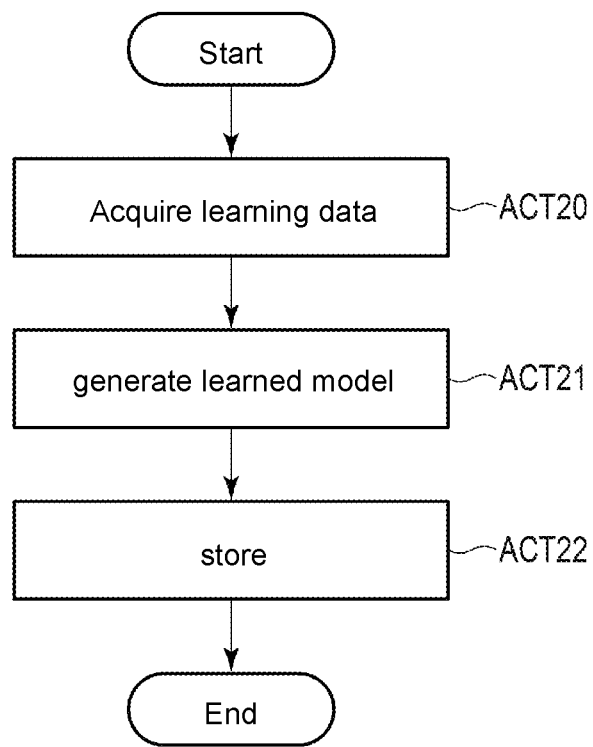
FIG. 15 is a flowchart showing an example of a generation process for a learned model by the processor of the reading apparatus according to the embodiment.

FIG. 15 is a flowchart showing an example of a generation process for the learned model by the processor 101 of the reading apparatus 100. Here, a generation example for a learned model of the plurality of learned models, which is based on learning data depending on the environment in which the metal item is not arranged with respect to the communication apparatus 10, will be described. A generation example for the other learned models may be similar thereto, and the description will be omitted. It should be noted that a procedure of processes to be described below is merely an example, and each process may be changed as long as it is possible. Further, as to the procedure of processes to be described below, steps can be omitted, substituted, or added as appropriate in accordance with the embodiment.

The model processing unit 1017 of the processor 101 may start the generation process for the learned model an arbitrary timing and newly create a learned model. The model processing unit 1017 may start the generation process for the learned model at an arbitrary timing and update the learned model.

In Step S20 of FIG. 15, the model processing unit 1017 of the processor 101 acquires learning data. For example, the model processing unit 1017 acquires learning data from the learning data storage area 1114.

In Step S21, the model processing unit 1017 of the processor 101 generates learned model by machine learning based on the learning data. For example, the model processing unit 1017 learns the learning data by machine learning. The model processing unit 1017 estimates a relationship between the plurality of data sets regarding the wireless tags 600 that are the plurality of learning targets and correct data indicating the range in which each of the wireless tags 600 that are the plurality of learning targets is present. The model processing unit 1017 generates a learned model on the basis of the estimation. A neural network or the like is used for the machine learning, though not limited thereto.

The learning tag data of the wireless tags 600 that are the learning targets varies depending on the distance between the antenna 300 and each of the wireless tags 600 that are the learning targets irrespective of whether the tag data is phase data or received signal strength indicator data. The pattern of the data set regarding the wireless tags 600 that are the learning targets is different for each of the positions of the wireless tags 600 that are the learning targets. The data set regarding the wireless tags 600 that are the learning targets and the positions of the wireless tags 600 can have a certain correlation.

In Step S22 of FIG. 15, the model processing unit 1017 of the processor 101 stores the generated learned model in the learned model storage area 1115.

In accordance with this embodiment, the communication apparatus includes the antenna. The communication apparatus includes the driving device that moves the antenna position. The communication apparatus further includes the processor. The first acquisition unit of the processor acquires the tag data of each wireless tag at the plurality of positions of the antenna. The input unit of the processor inputs the tag data of each wireless tag acquired by the first acquisition unit into the learned model selected from the plurality of learned models in a manner that depends on the environment of the communication apparatus. On the basis of the input of the tag data of each wireless tag into the learned model by the input unit, the second acquisition unit of the processor acquires the data indicating the range in which each wireless tag is present from the learned model. The plurality of learned models is models depending on the environment of the communication apparatus and is models generated by machine learning based on the plurality of pieces of learning data. The plurality of pieces of learning data includes the tag data of the wireless tags that are the plurality of learning targets and the data indicating the range in which each of the wireless tags that are the plurality of learning targets is present. By using the learned model depending on the environment of the communication apparatus, the communication apparatus can improve the accuracy of the data indicating the range in which each wireless tag is present. Therefore, the communication apparatus can provide a technology of improving the determination accuracy of the wireless tag position.

In the communication apparatus, the selection unit of the processor selects the learned model from the plurality of learned models. The first acquisition unit of the processor acquires the tag data of the reference wireless tag at the plurality of positions of the antenna depending on the environment of the communication apparatus. The selection unit selects a learned model from the plurality of learned models on the basis of the tag data of the reference wireless tag. By using the tag data of the reference wireless tag depending on the environment of the communication apparatus, the communication apparatus can improve the selection accuracy of the learned model depending on the environment of the communication apparatus. Therefore, the communication apparatus can improve the accuracy of the data indicating the range in which each wireless tag is present.

The selection unit of the processor selects a learned model from the plurality of learned models on the basis of the comparison of the tag data of the reference wireless tag with the plurality of pieces of comparative tag data associated with the plurality of learned models. By using the plurality of pieces of comparative tag data associated with the plurality of learned models, the communication apparatus can improve the selection accuracy of the learned model depending on the environment of the communication apparatus. Therefore, the communication apparatus can improve the accuracy of the data indicating the range in which each wireless tag is present.

The environment of the communication apparatus includes the arrangement aspect of the metal item with respect to the communication apparatus. The communication apparatus is capable of selecting the learned model depending on the arrangement aspect of the metal item with respect to the communication apparatus. Therefore, the communication apparatus can improve the accuracy of the data indicating the range in which each wireless tag is present.

The tag data includes at least one of the phase data or the received signal strength indicator data. By using at least one of the phase data or the received signal strength indicator data, the communication apparatus can improve the accuracy of the data indicating the range in which each wireless tag is present.

A modified example of this embodiment will be described. The example in which the processor 101 of the reading apparatus 100 realizes the model processing unit 1017 that generates the learned model has been described, though not limited thereto. An apparatus other than the reading apparatus 100 may generate the learned model.

The example in which the storage device 111 of the reading apparatus 100 stores the plurality of pieces of comparative reference tag data, the plurality of pieces of learning data, and the plurality of learned models has been described, though not limited thereto. One or more apparatuses different from the reading apparatus 100 may store the plurality of pieces of comparative reference tag data, the plurality of pieces of learning data, and the plurality of learned models.

The example in which the processor 101 of the reading apparatus 100 acquires the determinative output data by processing of the software has been described, though not limited thereto. The communication apparatus 10 may include a reasoner using the learned model. In this example, the input unit 1014 of the processor 101 inputs the determinative input data into the reasoner. Inputting the determinative input data into the learned model by the reading apparatus 100 includes sending the determinative input data to the reasoner from the reading apparatus 100. The second acquisition unit 1015 of the processor 101 acquires the determinative output data from the learned model on the basis of the input of the determinative input data into the learned model. Acquiring the determinative output data from the learned model by the reading apparatus 100 includes receiving the determinative output data from the reasoner by the reading apparatus 100.

The communication apparatus may be realized by the plurality of apparatuses as described above in the example or may be realized by a single apparatus integrating the functions of the plurality of apparatuses. The reading apparatus, the driving apparatus, and the antenna may be realized by the single apparatus integrating the functions. The reading apparatus may be realized by the plurality of apparatuses in which the functions are distributed.

The programs may be transferred in a state stored in the apparatus according to the embodiment or may be transferred in a state not stored in the apparatus. In the latter case, the programs may be transferred over a network or may be transferred in a state recorded on a storage medium. The storage medium is a non-transitory physical medium. The storage medium is a computer-readable medium. The storage medium only needs to be a medium capable of storing programs of a CD-ROM, a memory card, and the like and capable of being read by the computer, and can be in any form.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A communication apparatus, comprising:
an antenna;
a driving device that moves the antenna; and
a processor configured to:
acquire tag data of a reference wireless tag depending on an environment of the communication apparatus, at the plurality of positions of the antenna via the antenna, the tag data including first tag data of first reference wireless tags at a first plurality of positions where the first tag data indicates that there is metal in the environment in proximity to the communication apparatus at the first plurality of positions and second tag data of second reference wireless tags at a second plurality of positions where the second tag data indicates that there is no metal in the environment of the second plurality of positions in proximity to the communication apparatus, acquire tag data of a plurality of wireless tags at the plurality of positions of the moved antenna via the antenna, select a learned model from a plurality of learned models in a memory of the communication apparatus on the basis of comparison of the tag data of the reference wireless tag in the environment including the metal and in the environment not based on metal in the environment with a plurality of pieces of comparative tag data associated with the plurality of learned models, the plurality of learned models being models depending on the environment of the communication apparatus and being models generated by machine learning based on a plurality of pieces of learning data, and the plurality of pieces of learning data including tag data of wireless tags that are a plurality of learning targets and data indicating a range in which each of the wireless tags that are the plurality of learning targets is present, input the acquired tag data of each wireless tag into the learned model selected from the plurality of learned models, and acquire, on the basis of input of the tag data of each wireless tag into the learned model, the data indicating the range in which each wireless tag is present from the learned model.

2. The communication apparatus according to claim 1, wherein the tag data includes at least one of phase data or received signal strength indicator data.

* * * * *